UNITED STATES PATENT OFFICE 2,256,096

POLYAZO COMPOUNDS

Eugene A. Markush, Jersey City, N. J., assignor to Pharma Chemical Corporation, New York, N. Y., a corporation of New York No Drawing. Application June 3, 1938, Serial No. 211,603

4 Claims. (Cl. 260—173)

My invention relates to polyazo compounds and processes for producing the same and refers particularly to compounds of the character described which have the property of dyeing textile fibers and fabrics and also yielding valuable lakes.

I have found that polyazo compounds of the character described may be employed for the dyeing of colors having excellent fastness to light upon cellulosic fibers and fabrics such as cotton, rayon, and other fibers and fabrics of a cellulosic nature.

I have found, further, that these polyazo compounds can be applied to the fibers and fabrics as completely finished compounds and that they may also be produced upon the fiber or fabric as will be explained later.

I give the following as examples for the production of some of the polyazo compounds of my invention:

Example 1

303 pounds of 2-naphthylamine-6.8-disulphonic acid in the form of its sodium salt are dissolved in water and 290 pounds of muriatic acid are added, cooled, and diazotized with 70 pounds sodium nitrite dissolved in 250 pounds of water. To the obtained diazo compound a mixture of 136 pounds of 3-methyl-1-aminobenzene in 650 pounds of water and 150 pounds of hydrochloric acid 20 Bé. are added. The reaction mixture is stirred for about two hours, then gradually neutralized, then acidified, and rediazotized with the required amount of sodium nitrite. To the obtained diazonium a solution of 117 pounds of 3-methyl-1-amino-benzene in 500 pounds of water containing 135 pounds of hydrochloric acid is added.

The reaction mixture is then gradually neutralized and condensed in the usual manner with 300 pounds 4-nitro-1-benzoyl-chloride. The compound is then filtered, suspended in water, and the nitro compound thus formed is reduced to the amino compound with sodium sulphide. By salting out the reaction mixture, the amino compound can be separated by filtration, then suspended in 10,000 pounds of hot water, cooled to room temperature, 63 pounds sodium nitrite added, and diazotized by running the mixture into 350 pounds of hydrochloric acid diluted with ice and water. After two hours the diazotization is completed and the diazonium coupled with 2-hydroxy-naphthalene by adding the diazo compound to a solution of 135 pounds of 2-hydroxy-naphthalene in 1,000 pounds of water containing 40 pounds of sodium hydroxide, after which 200 pounds of sodium carbonate are added.

The reaction mixture is heated to 50° C. sodium chloride added as needed and filtered. The formula of the obtained compound is:

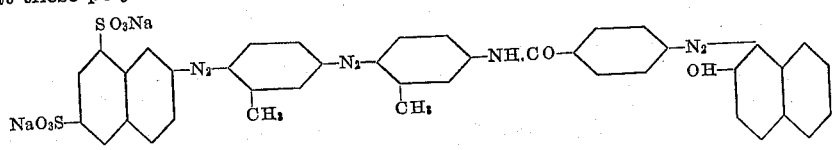

The solution of this dye when treated with hydrochloric acid precipitates the free acid dye.

The compound dyes cellulosic fibers a clear bright orange shade from an alkaline bath.

The coupling with 2-hydroxy-naphthalene may be carried out on the fiber by dyeing the fiber with "the last amino compound," immersing the thus dyed fiber in sodium nitrite and hydrochloric acid, then rinsing the fiber and immersing it in an alkaline solution of 2-hydroxy-naphthalene. The shade thus produced is of a clear orange shade.

Example 2

156 pounds of 2-naphthylamine-6.8-disulphonic acid in the form of its sodium salt are dissolved in water and 145 pounds muriatic acid are added, the mixture cooled, and diazotized with 35 pounds of sodium nitrite. To the obtained diazo compound 68 pounds of 3-methyl-1-amino-benzene in 325 pounds of water and 75 pounds of muriatic acid are added. The reaction mixture is stirred for about two hours, then gradually neutralized, then acidified and rediazotized with the required amount of sodium nitrite. To the obtained diazonium a solution of 58 pounds of 2-methyl-1-amino-benzene in 250 pounds of water containing 68 pounds hydrochloric acid is added.

The reaction mixture is gradually neutralized and condensed in the usual manner with 150 pounds of 4-nitro-1-benzoylchloride. The compound is filtered, suspended in water, and reduced with sodium sulphide. By salting out the reaction mixture, the amino compound can be separated by filtration, then suspended in 5,000 pounds of hot water, cooled to room temperature, 32 pounds sodium nitrite added, and diazotized by running the mixture into 175 pounds hydrochloric acid, diluted with ice and water.

After two hours the diazotization is complete and the diazonium then coupled with 112 pounds of 2-naphthol-6-sulphonic acid. The dye filtered, pressed, and dried.

The formula of the free acid dye is:

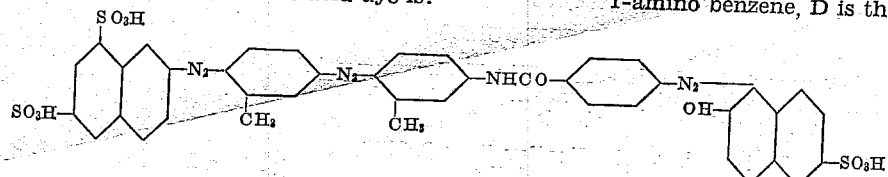

The shade produced upon cellulosic fibers is of a clear orange shade.

As a last coupling component 2-naphthol-5-sulphonic acid as well as 2-naphthol-7-sulphonic acid may be used.

*Example 3*

The dye prepared according to Example 2, in the form of its free acid, is dissolved in 5,000 pounds of water, and 300 pounds of calcium chloride in 3,000 pounds of water are added. The tricalcium salt is then separated by filtration, washed well in order to free it from the excess calcium chloride, and the obtained lake dried.

If, in place of calcium chloride, the equivalent quantity of barium chloride is being used, the barium lake of the dye is obtained. The colors thus produced are of a clear bright orange shade.

I do not limit myself to the chemicals, times, temperatures, quantities, and steps of procedure specifically mentioned as these are given solely for the purpose of clearly describing my invention.

What I claim is:

1. A polyazo compound having the general formula:

A—N=N—B—N=N—B—NH—CO—D—N=N—R in which A is the radical of 2-naphthylamine-6.8-disulphonic acid, B is the radical of 3-methyl-1-amino benzene, D is the radical of 4-amino-1-benzoyl chloride, and R is the radical of a member of the group consisting of beta naphthol and its sulphonated compounds which dyes are dark brown powders, soluble in water with red coloration, soluble in concentrated sulphuric acid producing brown shades and which compounds dye cellulosic fibers bright-orange shades.

2. A polyazo compound having the general formula:

A—N=N—B—N=N—B—NH—CO—D—N=N—R in which A is the radical of 2-naphthylamine-6.8-disulphonic acid, B is the radical of 3-methyl-1-amino benzene, D is the radical of 4-amino-1-benzoyl chloride, and R is the radical of 2-hydroxy-naphthalene which dyes are dark brown powders, soluble in water with red coloration, soluble in concentrated sulphuric acid producing brown shades and which compounds dye cellulosic fibers bright-orange shades.

3. A polyazo compound having the general formula:

A—N=N—B—N=N—B—NH—CO—D—N=N—R in which A is the radical of 2-naphthylamine-6.8-disulphonic acid, B is the radical of 3-methyl-1-amino benzene, D is the radical of 4-amino-1-benzoyl chloride, and R is the radical of 2-naphthol-6-sulphonic acid which dyes are dark brown powders, soluble in water with red coloration, soluble in concentrated sulphuric acid producing brown shades and which compounds dye cellulosic fibers bright-orange shades.

4. A polyazo compound having the general formula:

A—N=N—B—N=N—B—NH—CO—D—N=N—R in which A is the radical of 2-naphthylamine-6.8-disulphonic acid, B is the radical of 3-methyl-1-amino benzene, D is the radical of 4-amino-1-benzoyl chloride, and R is the radical of 2-naphthol-7-sulphonic acid which dyes are dark brown powders, soluble in water with red coloration, soluble in concentrated sulphuric acid producing brown shades and which compounds dye cellulosic fibers bright-orange shades.

EUGENE A. MARKUSH.